United States Patent [19]
Okcuoglu et al.

[11] Patent Number: 5,310,388
[45] Date of Patent: May 10, 1994

[54] VEHICLE DRIVETRAIN HYDRAULIC COUPLING

[75] Inventors: Murat N. Okcuoglu; Theodore E. Shaffer, both of Santa Barbara, Calif.

[73] Assignee: ASHA Corporation, Santa Barbara, Calif.

[21] Appl. No.: 16,168

[22] Filed: Feb. 10, 1993

[51] Int. Cl.⁵ .............................................. F16H 1/44
[52] U.S. Cl. ................................................. 475/88
[58] Field of Search .................. 475/84, 86–91, 475/93, 99, 100, 101, 103, 108, 109, 116, 127, 174, 175, 231

[56] References Cited

U.S. PATENT DOCUMENTS

| | | |
|---|---|---|
| 2,004,929 | 6/1935 | Centervall . |
| 2,026,777 | 1/1936 | Dumble . |
| 2,775,141 | 12/1956 | Ronning . |
| 2,913,928 | 11/1959 | Double . |
| 2,922,319 | 1/1960 | Burner . |
| 3,229,550 | 1/1966 | Nickell . |
| 3,230,795 | 1/1966 | Mueller . |
| 3,251,244 | 5/1966 | Nickell . |
| 3,350,961 | 11/1967 | Dodge . |
| 3,361,008 | 1/1968 | Fallon . |
| 3,393,582 | 7/1968 | Mueller . |
| 3,407,599 | 10/1968 | Ulbricht . |
| 3,490,312 | 1/1970 | Seitz et al. . |
| 3,686,976 | 8/1972 | Philippi . |
| 3,724,289 | 4/1973 | Kennicutt . |
| 3,748,928 | 7/1973 | Shiber ................................... 475/88 |
| 3,752,280 | 8/1973 | Cheek . |
| 3,835,730 | 9/1974 | Pemberton . |
| 3,894,446 | 7/1975 | Snoy et al. . |
| 3,987,689 | 10/1976 | Engle . |
| 4,012,968 | 3/1977 | Kelbel . |
| 4,041,804 | 8/1977 | Clark . |
| 4,258,588 | 3/1981 | Yum . |
| 4,263,824 | 4/1981 | Mueller . |
| 4,272,993 | 6/1981 | Kopich . |
| 4,388,916 | 6/1983 | Lucia ................................... 210/742 |
| 4,445,400 | 5/1984 | Sullivan et al. . |
| 4,493,387 | 1/1985 | Lake et al. . |
| 4,548,096 | 10/1985 | Giocastro et al. . |
| 4,601,359 | 7/1986 | Weismann et al. . |
| 4,606,428 | 8/1986 | Giere . |
| 4,630,505 | 12/1986 | Williamson . |
| 4,644,822 | 2/1987 | Batchelor . |
| 4,650,028 | 3/1987 | Eastman et al. . |
| 4,679,463 | 7/1987 | Ozaki et al. . |
| 4,714,129 | 12/1987 | Mueller . |
| 4,719,998 | 1/1988 | Hiramatsu et al. . |
| 4,727,966 | 3/1988 | Hiramatsu et al. ................ 475/88 X |
| 4,730,514 | 3/1988 | Shikata et al. ....................... 475/88 |
| 4,732,052 | 3/1988 | Dewald . |
| 4,821,604 | 4/1989 | Asano . |
| 4,867,012 | 9/1989 | McGarraugh . |
| 4,876,921 | 10/1989 | Yasui et al. . |
| 4,884,470 | 12/1989 | Onoue . |
| 4,905,808 | 3/1990 | Tomita et al. . |
| 4,909,371 | 3/1990 | Okamoto et al. . |
| 4,919,006 | 4/1990 | Willett et al. . |
| 4,957,473 | 9/1990 | Takemura et al. . |
| 4,960,011 | 10/1990 | Asano . |
| 4,966,268 | 10/1990 | Asano et al. . |
| 4,974,471 | 12/1990 | McGarraugh . |
| 5,005,131 | 4/1991 | Imaseki et al. . |
| 5,189,930 | 3/1993 | Kameda . |

FOREIGN PATENT DOCUMENTS 1079479  3/1984  U.S.S.R. ..................... 475/174

*Primary Examiner*—Dirk Wright
*Attorney, Agent, or Firm*—Brooks & Kushman

[57] ABSTRACT

A hydraulic coupling (32) includes a control valve (80) that controls pumping from a casing inlet port (58) by a hydraulic pump (48) through a casing outlet port (78) to control coupling between two rotary members. The casing (34) is connected to one of the rotary members while an impeller (50) having between five and seven external teeth is connected to the other rotary member and meshed with an internal ring gear (54) having one more tooth than the number of impeller teeth to provide sufficient pumping capacity so that the pump can act as a brake while still having relatively constant pumping pressure. The control valve (80) includes a bimetallic valve element (82) that compensates for temperature changes and may also include a speed sensitive valve closure (104) for providing immediate coupling without delay above certain speeds of operation. Mounting of the bimetallic valve element (82) of control valve (80) within a recess (98) provides accurate control of the temperature compensation.

22 Claims, 5 Drawing Sheets

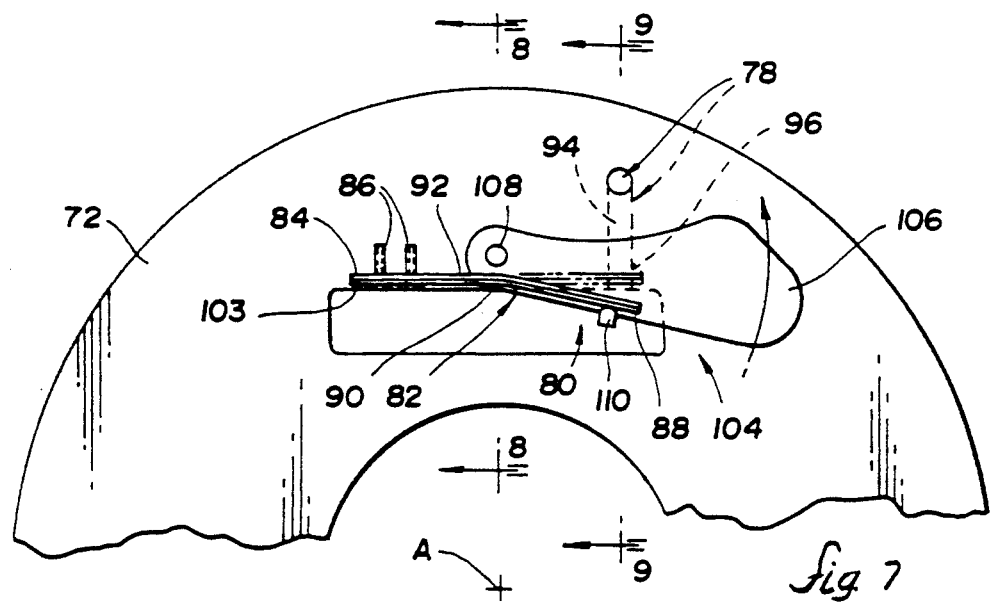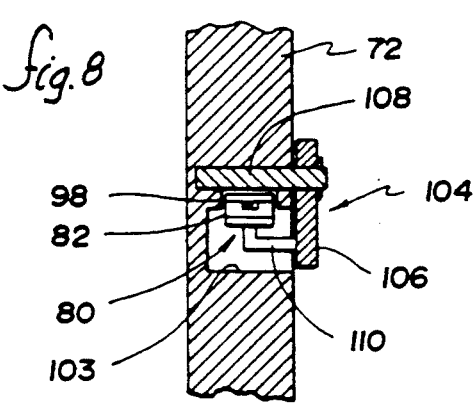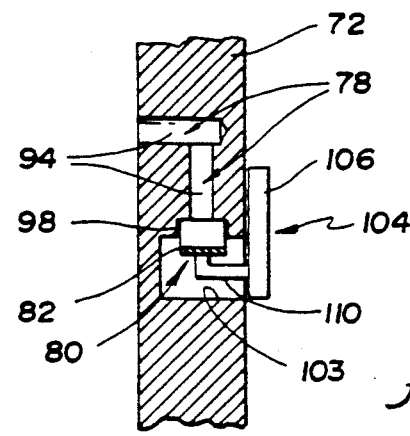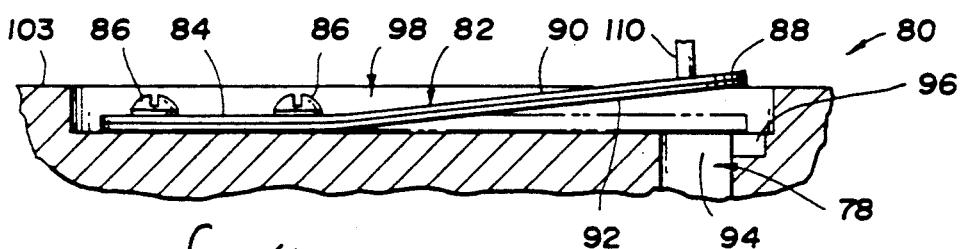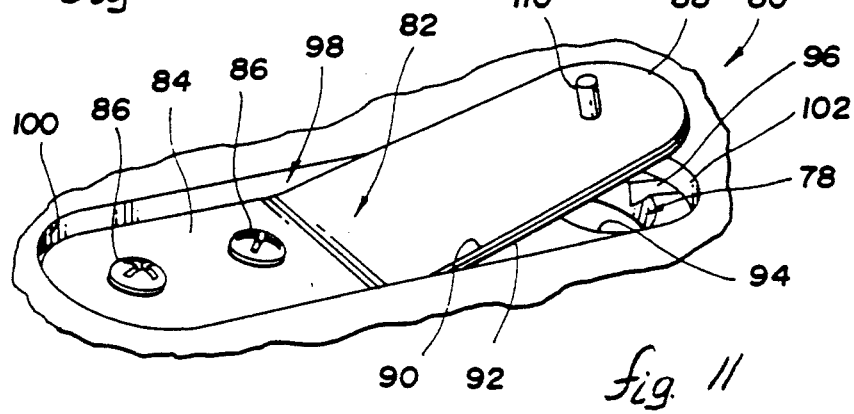

VEHICLE DRIVETRAIN HYDRAULIC COUPLING

TECHNICAL FIELD

This invention relates to a hydraulic coupling for use with a vehicle drivetrain within a housing thereof containing hydraulic fluid to rotatively couple a pair of rotary members about a rotational axis.

BACKGROUND ART

Hydraulic couplings have previously utilized hydraulic pumps to couple rotary members of a vehicle drivetrain. For example, U.S. Pat. No. 4,012,968 Kelbel discloses a differential mechanism wherein a hydraulic pump of the Gerotor type is located radially outward from the axis of rotation of the two members and provides pumped hydraulic fluid to a clutch that controls operation of a bevel type planetary gear set to limit the differential action so as to thus have a limited slip function. U.S. Pat. No. 4,730,514 Shikata et al. discloses another differential mechanism wherein a hydraulic pump controls operation of a bevel gear type planetary gear set that extends between two rotary members such that a limited slip function of the differential gear operation is also provided. Furthermore, U.S. Pat. Nos. 4,719,998 Hiramatsu et al.; 4,727,966 Hiramatsu et al. and 4,909,371 Okamoto et al. disclose hydraulic pumps utilized within vehicle drivetrains to control actuation of a clutch that connects two rotary members of a vehicle drivetrain.

DISCLOSURE OF INVENTION

An object of the present invention is to provide an improved coupling for use with a vehicle drivetrain within a housing thereof containing hydraulic fluid to rotatively couple a pair of rotary members about a rotational axis.

In carrying out the above object, the hydraulic coupling of the present invention includes a casing of a hollow construction that is rotatable within the housing about the rotational axis and connected to one of the rotary members. A hydraulic pump is located within the casing along the rotational axis and includes an impeller rotatively connected to the other rotary member and having between five and seven external teeth. The hydraulic pump also includes an internal ring gear mounted by the casing for rotation eccentrically with respect to the toothed impeller and including internal teeth of a number one more than the impeller teeth and in a meshing relationship therewith to provide a pumping action upon relative rotation between the casing and the toothed impeller. An inlet port is provided through which hydraulic fluid is pumped into the casing by the hydraulic pump and an outlet port is also provided through which the pumped hydraulic fluid flows. A control valve of the coupling closes the outlet port when the pumped fluid reaches a predetermined pressure to rotatively couple the impeller with the internal ring gear and thereby also couple the pair of rotary members to each other.

The control valve includes an elongated metallic strip valve element having one end that is mounted in a spaced relationship to the outlet port and having another distal end that is movable between an open position spaced from the outlet port and a closed position that closes the outlet port. This control valve element is of the bimetallic type that is sensitive to temperature and moves toward the outlet port upon heating as the hydraulic fluid is heated as well as moving away from the outlet port upon cooling as the hydraulic fluid is cooled, such that the valve closing is compensated for viscosity changes as the hydraulic fluid is heated and cooled during use.

The outlet port controlled by the control valve has a main passage that is closed by the valve element and also has a bleed passage through which hydraulic fluid bleeds with the valve element closed. The valve construction is also preferably provided with an elongated mounting recess having one end at which the one end of the valve element is mounted and having another end at which the main passage and bleed passage of the outlet port are located.

In the preferred construction, the hydraulic coupling is also provided with a valve closure that moves the valve element to the closed position upon rotation of the casing above a predetermined speed. This valve closure is disclosed as a centrifugal weight having a pivotal connection that provides mounting thereof and as also including an actuating portion that moves the valve element to the closed position with respect to the outlet port upon rotation of the casing above the predetermined speed.

The hydraulic coupling is also disclosed as including a clutch that extends between the casing connected to the one rotary member and the other rotary member. This clutch includes an actuating piston, and the casing also includes a transfer port through which the pumped hydraulic fluid is fed to the clutch actuating piston from the hydraulic pump.

In one disclosed embodiment, the hydraulic coupling includes a planetary gear set that connects the casing and the one rotary member. The clutch of this embodiment under the operation of the control valve connects the casing and the other rotary member to thereby limit differential operation of the planetary gear set.

In another embodiment, the hydraulic coupling also includes a planetary gear set that connects the casing and the one rotary member but relies solely on the pumping operation of the pump whose impeller is connected to the other rotary member to limit the differential operation of the planetary gear set.

In a further embodiment, the casing has a fixed connection to the one rotary member. This one rotary member is disclosed as having a ring shape that is secured by the fixed connection to the casing, and the other rotary member is disclosed as having an elongated shape that extends through the casing and through the one ring-shaped rotary member along the rotational axis.

A further disclosed embodiment of the hydraulic coupling includes a second hydraulic pump having an impeller and an internal ring gear with a meshed relationship and a toothed construction like the first mentioned hydraulic pump but with the impeller thereof rotatively connected to the one rotary member. Second inlet and outlet ports are also provided through which the second hydraulic pump pumps hydraulic fluid into and out of the casing. A second clutch of this embodiment extends between the casing and the one rotary member and includes a second actuating piston through which the second outlet port extends. A second control valve closes the second outlet port when the pumped fluid from the second hydraulic pump reaches a predetermined pressure. The casing of this embodiment includes a second transfer port through which the pumped hydraulic fluid is fed to the actuating piston of the second clutch from the second hydraulic pump. The second hydraulic pump and second clutch cooperate to connect the casing and the one rotary member.

The objects, features and advantages of the present invention are readily apparent from the following detailed description of the best modes for carrying out the invention when taken in connection with the accompanying drawings.

BRIEF DESCRIPTION OF DRAWINGS

FIG. 7 a longitudinal view taken along the direction of line 7—7 in FIG. 1 to illustrate a control valve that is associated with an outlet port through which the hydraulic fluid is pumped from the casing and whose operation controls the coupling of the rotary members to each other;

FIG. 8 is a sectional view taken along the direction of line 8—8 in FIG. 7 and further discloses a valve closure which closes the valve when the casing rotates above a predetermined speed;

FIG. 9 is a sectional view taken along the direction of line 9—9 in FIG. 7 to further illustrate the control valve and valve closure construction;

FIG. 10 is a partial sectional view that further illustrates the construction of the control valve at the outlet with a valve element thereof shown in a solid line indicated open position and a phantom line indicated closed position with respect to the outlet port;

FIG. 11 is a perspective view that further illustrates the construction of the outlet port and the associated valve;

BEST MODES FOR CARRYING OUT THE INVENTION

Figure 1:
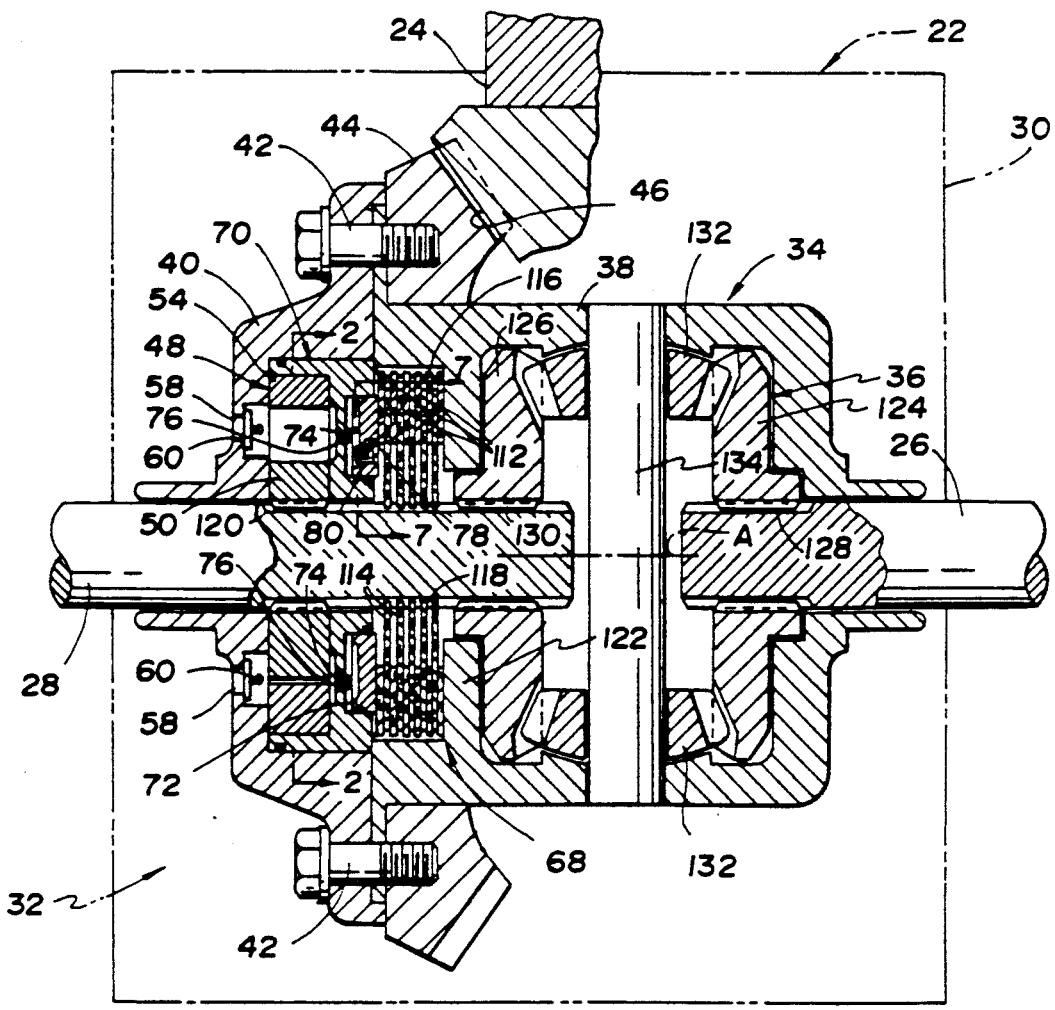
FIG. 1 is a sectional view taken through one embodiment of a hydraulic coupling constructed in accordance with the present invention to couple a pair of rotary members by a hydraulic pump having an associated clutch for limiting differential operation of a planetary gear set embodied by a bevel type differential.

With reference to FIG. 1 of the drawings, a partially illustrated vehicle drivetrain that is generally indicated by 20 includes a differential 22 that is rotatively driven from the vehicle engine by a rotary drive member 24 and operates to drive a pair of axial half shafts 26 and 28 that respectively embody a pair of rotary members which rotate about a rotational axis A. The differential includes a housing 30 for containing hydraulic fluid and having suitable unshown seals through which the rotary members 24, 26 and 28 project Within the housing 30, the differential includes a hydraulic coupling 32 that embodies the present invention and operates to rotatively couple the axial half shafts 26 and 28 driven by the rotary drive member 24 as is hereinafter more fully described.

With continuing reference to FIG. 1, the hydraulic coupling 32 includes a casing 34 of a hollow construction that is rotatable within the housing about the rotational axis A and connected to one of the rotary members, which in the illustrated embodiment is the right axle half shaft 26, with the connection being provided by a planetary gear set 36 that is of the bevel gear planetary type as is hereinafter more fully described. Casing 34 as illustrated includes a cup-shaped member 38 and a cap member 40 which each have peripheral flanges secured to each other by circumferentially spaced bolts 42 that also secure a ring gear 44 of the bevel type which is rotatively driven by a bevel driving portion 46 of the drive member 24.

Figure 2:
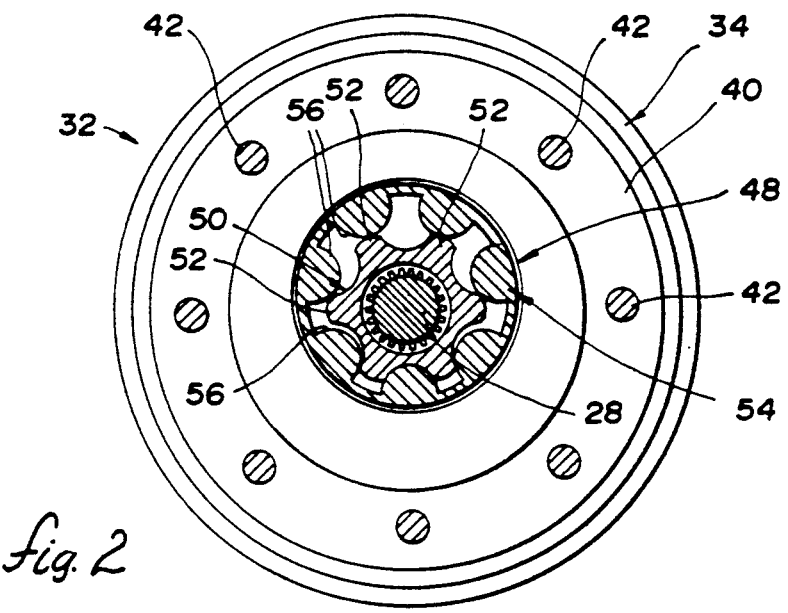
FIG. 2 is a sectional view taken through the pump along the direction of line 2—2 in FIG. 1 and discloses the pump as having an impeller with six teeth meshed with an internal ring gear having seven teeth to provide a pumping action that allows the pump to function as a brake while still having relatively constant pumping pressure that facilitates actuation of the associated clutch without fluid pressure pulsation.
Figure 3:
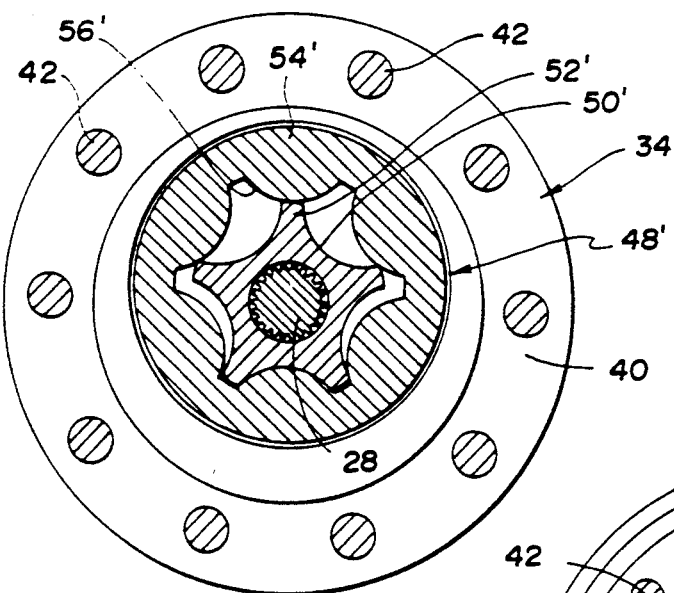
FIG. 3 is a view similar to FIG. 2 to illustrate that the pump can also have its impeller provided with five teeth and its internal ring gear provided with six teeth when a greater pumping capacity is desired.
Figure 4:
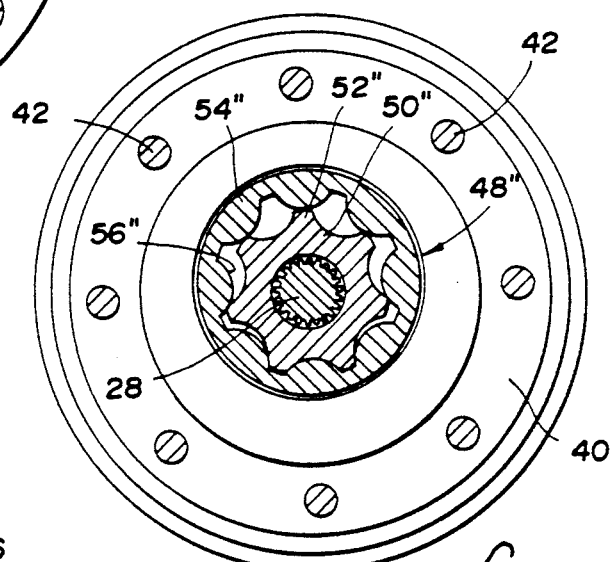
FIG. 4 is a view similar to FIGS. 2 and 3 but illustrating the impeller as having seven teeth and the internal ring gear as having eight teeth when a more constant fluid pressure is desired.

With combined reference to FIGS. 1 and 2, the hydraulic coupling 32 also includes a hydraulic pump 48 located within the casing 34 along the rotational axis A and including an impeller 50 having external teeth 52. The hydraulic pump also includes an internal ring gear 54 mounted by the casing 34 for rotation eccentrically with respect to the toothed impeller 50 and including internal teeth 56 of a number that is one more than the impeller teeth and which are in a meshing relationship with the impeller teeth to provide a pumping action upon relative rotation between the casing and the toothed impeller. As is hereinafter more fully described, the impeller 50 most preferably has five teeth 52 and the internal ring gear 54 has six teeth 56 which is a relationship that provides sufficient pumping capacity so that the hydraulic pump can act effectively as a brake while still having relatively constant pumping pressure without fluid pulsation that would adversely affect the hydraulic coupling provided between the rotary members. As shown in FIG. 3, it is also possible for the hydraulic pump 48' to have its impeller 50' provided with five external teeth 52' and for the ring gear 54' to have six teeth 56' meshed with the impeller teeth which is a construction that will provide a somewhat greater pumping capacity but less consistency in the fluid pressure but not so inconsistent as to interfere with effective hydraulic coupling between the rotary members. Likewise as illustrated in FIG. 4, it is also possible for the hydraulic pump 48" to have its impeller 50" provided with seven internal teeth 52" and its internal ring gear 54" to have eight teeth 56" when more consistent fluid pressure is desirable even though there is an accompanying decrease in the amount of pumped fluid. Thus, the impeller has between five and seven external teeth with six being most preferable while the internal ring gear has one more tooth than the number of impeller teeth utilized.

Figure 5:
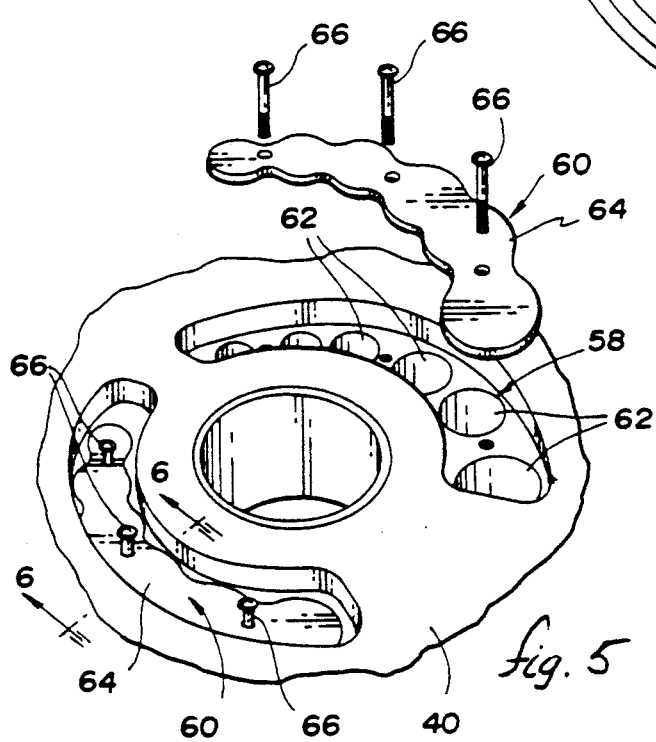
FIG. 5 is an exploded perspective view illustrating the construction of inlet valves for inlet ports through which hydraulic fluid is pumped into a casing of the coupling.
Figure 6:
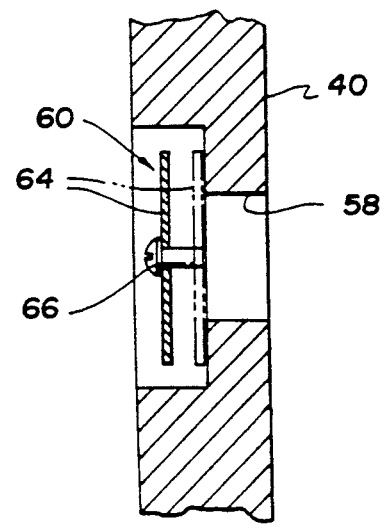
FIG. 6 is a sectional view taken along the direction of line 6—6 in FIG. 5 to illustrate the opening and closing valve operation.

With combined reference to FIGS. 1, 5 and 6, the casing 34 has an inlet 58 through which hydraulic fluid is pumped into the casing by the hydraulic pump 48. As illustrated in FIG. 1, there are actually two of the inlets 58 such that the pumping takes place in both direction of relative rotation between the rotary member embodied by the axle half shaft 28 and the casing 34. In this connection, each of the inlets 58 includes an associated check valve 60 for opening and closing inlet bores 62 of varying size along the direction of rotation. Each check valve 60 as shown in FIGS. 5 and 6 has a thin valve element 64 that is mounted by guides such as the threaded bolts 66 show for movement between the solid line indicated open position of FIG. 6 and the phantom line indicated closed position. Upon one direction of relative rotation between the impeller 50 and the internal gear 54 shown in FIG. 2, one of the check valves 60 opens to permit the hydraulic fluid to be pumped from the housing 30 into the casing 34 while the other check valve 60 is then closed so that the hydraulic fluid is not pumped out of the casing through the other inlet port. During the opposite direction of relative rotation between the impeller 50 and the casing 34, the open and closed positions of the inlet ports 58 is reversed.

In the embodiment illustrated in FIG. 1, a clutch 68 is received within the cup-shaped member 38 of casing 34 adjacent the junction thereof with the cap member 40 of the casing. Within the casing cap member 40, a pump housing insert 70 is mounted and receives the hydraulic pump 48 as well as interfacing with the clutch 68. This insert 70 has an annular cylinder bore that receives a clutch actuating piston 72 that actuates the clutch 68 as is hereinafter more fully described to couple the casing 34 with the left axle half shaft 28 as is also hereinafter more fully described. Insert 70 also has a pair of transfer ports 74 through which hydraulic fluid is pumped from the hydraulic pump 48 to the clutch actuating piston 72. This flow through the transfer ports 74 is through one of the transfer ports upon one direction of relative rotation between the impeller 52 and the ring gear 54 and is through the other transfer port during the other direction of relative rotation between the impeller and the ring gear. Each of the transfer ports 74 has an associated check valve 76 of a construction that is hereinafter more fully described in connection with FIGS. 15 through 17. These check valves 76 ensure that the hydraulic fluid pumped through either transfer port to the clutch actuating piston 72 is not pumped back into the hydraulic pump 48 through the other transfer port.

As best illustrated in FIGS. 7 and 9, an outlet port 78 is also provided and in the embodiment of FIG. 1 is located on the clutch actuating piston 72. A control valve 80 of the coupling closes the outlet port 78 as is hereinafter more fully described when the pumped fluid reaches a predetermined pressure which is proportional to the relative rotation between the pump impeller and ring gear and thus corresponds to the relative rotation between the right axle half shaft 26 connected through the differential 36 to the casing 34 and the left axle half shaft 28 that is connected to the impeller 50. As the pumped hydraulic fluid reaches the predetermined pressure, the valve 80 closes as is hereinafter more fully described to close the outlet port 78 and thus prevent the hydraulic fluid from being pumped from the hydraulic pump 48. This causes the hydraulic pump 48 to act as a brake by coupling the impeller 52 with the internal ring gear 54 and thereby also couples the rotary members embodied by the right and left axle half shafts 26 and 28 to each other.

As best illustrated in FIGS. 10 and 11, the valve 80 includes an elongated metallic strip valve element 82 having one end 84 that is mounted in a spaced relationship to the outlet port 78 in any suitable manner such as by the headed bolts 86 illustrated. Valve element 82 also has another distal end 88 that is movable between a solid line indicated open position spaced from the outlet port 78 as shown in FIG. 10 and a phantom line indicated closed position that closes the outlet port. This valve element 82 is of the bimetallic type and thus includes two metals 90 and 92 that have different coefficients of thermal expansion so as to cause the valve element to move as its temperature is raised and lowered. More specifically, as the hydraulic fluid is heated such as during continued usage, the valve element end 88 moves toward the outlet port 78 with the net result being that the less viscous fluid will close the valve 80 at the same pressure of pumped fluid corresponding to the same amount of relative rotation between the axle half shafts. Furthermore, upon cooling of the hydraulic fluid such as after rest for a certain period of time, the valve element end 88 moves away from the outlet port 78 such that the valve closes at the same pressure of pumping of the more viscous hydraulic fluid. Thus, the bimetallic valve element 82 compensates for viscosity changes as the hydraulic fluid is heated and cooled to ensure that the coupling between the two rotary members embodied by the two axle half shafts takes place at the same rate of relative rotation. More specifically, the valve closing as discussed above causes the hydraulic pump 48 to then function as a brake that limits the relative rotation between the two rotary members embodied by the two axle half shafts and also causes the actuation of the clutch 68 to further couple the two axle half shafts to each other.

As best illustrated in FIGS. 10 and 11, the outlet port 78 preferably includes a main passage 94 that is closed by the valve element 82 as its end 88 moves from the open position to the closed position as previously described. Outlet port 78 also includes a bleed passage 96 that remains open even when the valve element 82 is closed with respect to the main passage 94 in order to provide a bleed flow of hydraulic fluid that cools the clutch 68 and also ensures that the temperature of the hydraulic fluid within the pump 48 does not excessively increase at a rapid rate. When the valve element 82 opens, the fluid flow provides cleaning of the bleed passage 96 of the outlet port 78 to remove any small particles that might block the smaller cross-sectional flow area of the bleed passage. The control valve 80 is thus self cleaning during normal usage.

As shown in FIGS. 7-11 and best illustrated in FIGS. 10 and 11, the coupling includes an elongated mounting recess 98 having one end 100 at which the one end 84 of the valve element 82 is mounted and having another end 102 at which the main passage 94 and bleed passage 96 of the outlet port 78 are located. This recess in cooperation with the bimetallic valve element 82 provides a continually varying change in the cross-sectional flow area of flow to the outlet port 78 from the other side of the valve element such that movement of the valve element end 88 in response to temperature changes provides an accurate control of the pressure at which the valve element closes to initiate the operation of the hydraulic pump as a brake and the actuation of the clutch. For any given predetermined open position of the valve element 82, there is a certain pressure at which the hydraulic fluid of a certain velocity will cause closure of the valve element. This results from the flow of the hydraulic fluid between the valve element end 88 and the adjacent end of the recess 102 to the outlet port 78. This flow causes a pressure drop in the fluid upon passage past the valve element end 88 so that there is less force acting on the outlet side of the valve element end 88 than on the hydraulic pump side which are respectively the lower and upper sides as illustrated in FIG. 10. Movement of the valve element 82 to change the position of its end 88 in response to temperature changes varies the cross-sectional area of flow between this valve element end and the recess end 102 so as to thereby accurately compensate for temperature changes and ensure that the closure of the valve 80 corresponds to the same rate of relative rotation between the rotary members embodied by the axle half shafts 26 and 28 shown in FIG. 1.

As best illustrated in FIGS. 7-9, the valve element 82 moves radially with respect to the axis A and recess 98 is located within an elongated opening 103 that projects from the pump side of the piston 72 toward the clutch side of the piston. More specifically, the recess 98 is located within the opening 103 on the radial outward side thereof with respect to rotational axis A such that the distal valve element end 88 moves radially outward to the closed position and radially inwardly to the open position as well as moving radially outward and inward to adjust for temperature changes as previously described.

With reference to FIGS. 7-9, the hydraulic coupling is also illustrated as including a valve closure 104 that moves the valve element 82 to the closed position with respect to the outlet port 78 upon rotation of the coupling casing above a predetermined speed. This valve closure provides the immediate coupling between the rotary members embodied by the axle half shafts upon any relative rotation therebetween by operation of the hydraulic pump as a brake as well as immediate actuation of the clutch in the manner previously described. This valve closure 104 is preferably constructed to include a centrifical weight 106 having a pivotal connection 108 that provides mounting thereof such as on the piston 72 in the embodiment illustrated. The valve closure 104 also includes an actuating portion 110 that extends from the centrifical weight 106 and engages the valve element 82 to move the valve element to the closed position with respect to the outlet port 78 upon rotation of the coupling casing above the predetermined speed. More specifically, such rotation causes the centrifical force of the weight 106 to overcome the resiliency of the valve element 82 and provide movement thereof from the open position to the closed position so that the braking action provided by the hydraulic pump and the clutch actuation are immediate upon any relative rotation between the rotary members embodied by the axle half shafts as previously described.

With reference to FIG. the hydraulic coupling 20 whose one rotary member embodied by the right axle half shaft 26 is connected with the casing 34 also preferably has the clutch 68 previously described that extends between the other rotary member embodied by the other axle half shaft 28 and the casing. This clutch 68 includes alternating sets of clutch plates 112 and 114 with the one set of clutch plates 112 having outer peripheries with spline connections 116 to the casing 34, and with the other set of clutch plates 114 having a central opening with spline connections 118 to the axle half shaft 28 which also has spline connections 120 to the pump impeller 50 on the opposite side of the insert 70 from the clutch. Pumped hydraulic fluid acting on the clutch piston 72 as previously described compresses the sets of clutch plates 112 and 114 to provide the coupling between the casing 34 and the rotary member embodied by the axle half shaft 28. Pumped hydraulic fluid that flows through the actuating piston 72 through the bleed passage of the outlet port previously described then flows along the axle half shafts 26 and 28 for passage out of the casing 34.

As previously mentioned, the hydraulic coupling 32 illustrated in FIG. 1 has the planetary gear set 36 which is of the bevel gear type connecting the casing 34 and the one rotary member embodied by the right axle half shaft 26. This planetary gear set is positioned on the opposite side of a casing wall 122 from the clutch 68 and includes a pair of side gears 124 and 126 which have respective spline connections 128 and 130 to the rotary members embodied by the axle half shafts 26 and 28. Planet gears 132 of the gear set 36 are each meshed with the pair of side gears 124 and 126 and are rotatably supported by a cross pin 134 that extends through the rotational axis A between opposite sides of the casing 34. The planetary gear set 36 provides a differential action between the rotary members embodied by the axle half shafts 26 and 28 until closure of the valve 80 causes the hydraulic pump 48 to function as a brake and also actuate the clutch 68 as previously described whereupon the axle half shaft 26 is coupled through the spline connections 128, side gear 124, planet gears 132, side gear 126 and the spline connections 130 with the other axle half shaft 28.

Figure 12:
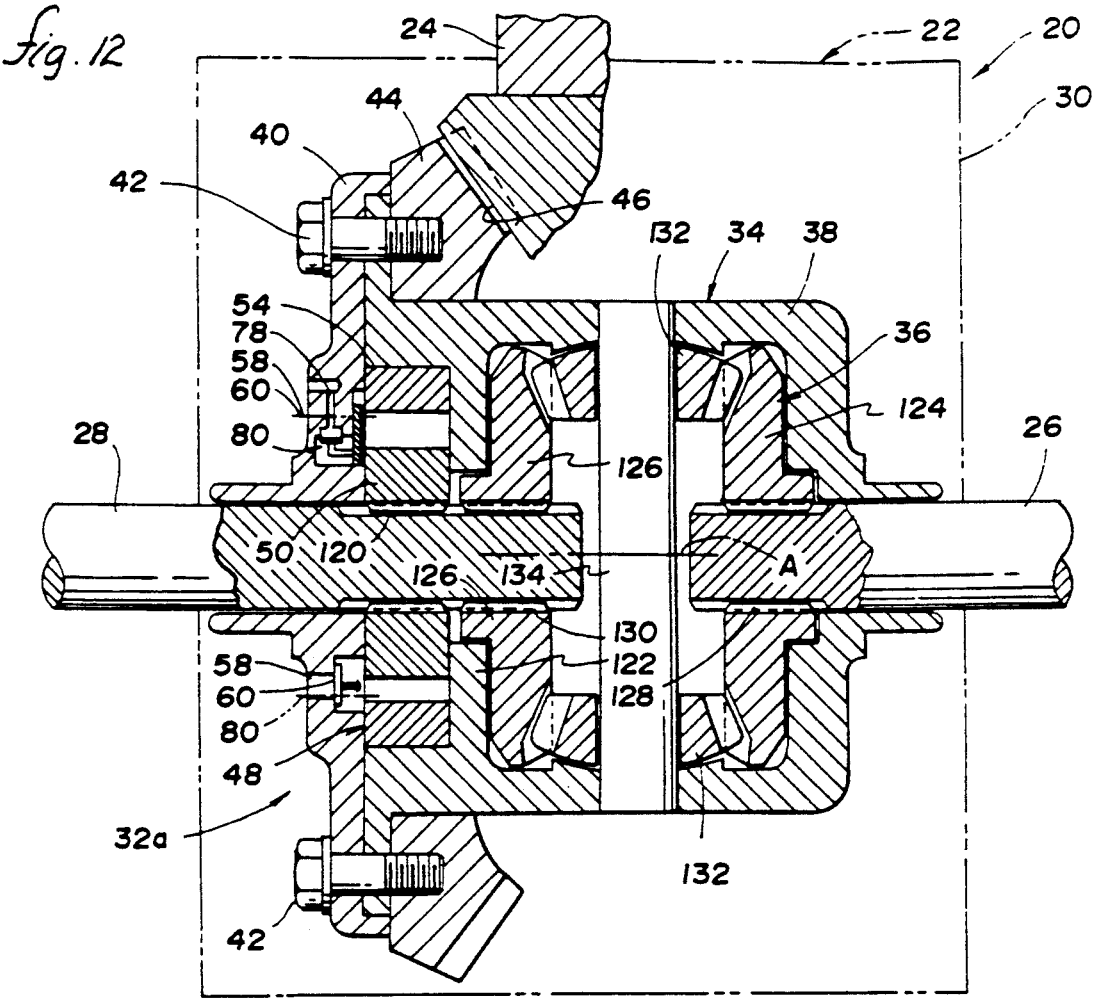
FIG. 12 is a sectional view similar to FIG. 1 of another embodiment wherein the hydraulic pump functions as a brake whose braking action provides the sole coupling operation that limits differential action of the associated planetary gear set.

With reference to FIG. 12, another embodiment of the hydraulic coupling according to the present invention is indicated by reference numeral 32a. This embodiment of the hydraulic coupling 32a has the same construction as the embodiment disclosed in FIGS. 1-11 except as will be noted and thus has like reference numerals applied to like components thereof such that much of the previous description is applicable and thus need not be repeated. However, in this embodiment, there is no clutch as with the previously described embodiment such that the braking action provided by the hydraulic pump 48 provides the sole coupling between the impeller 50 and the ring gear 54 and thus also the sole coupling between the pair of rotary members embodied by the right and left axle half shafts 26 and 28. In this embodiment, the casing cap member 40 has a pair of inlets 58 located on opposite sides of the rotational axis A, with each being provided with an associated check valve 60 but only one being fully shown and the other illustrated by a single phantom line schematic representation. Furthermore, the casing cap member 40 also has a pair of the outlet ports 78 located on opposite sides of the rotational axis A with each being provided with a control valve 80 of the same construction previously discussed, but with only one outlet and associated control valve being shown by full line representation and the other merely shown by a single phantom line schematic representation. Such provision of the pair of inlet ports and associated check valves and the pair of outlet ports and associated control valves allows the braking action provided by the hydraulic pump 48 to operate in both directions of relative rotation between the rotary members embodied by the axle half shafts 26 and 28.

Figure 13:
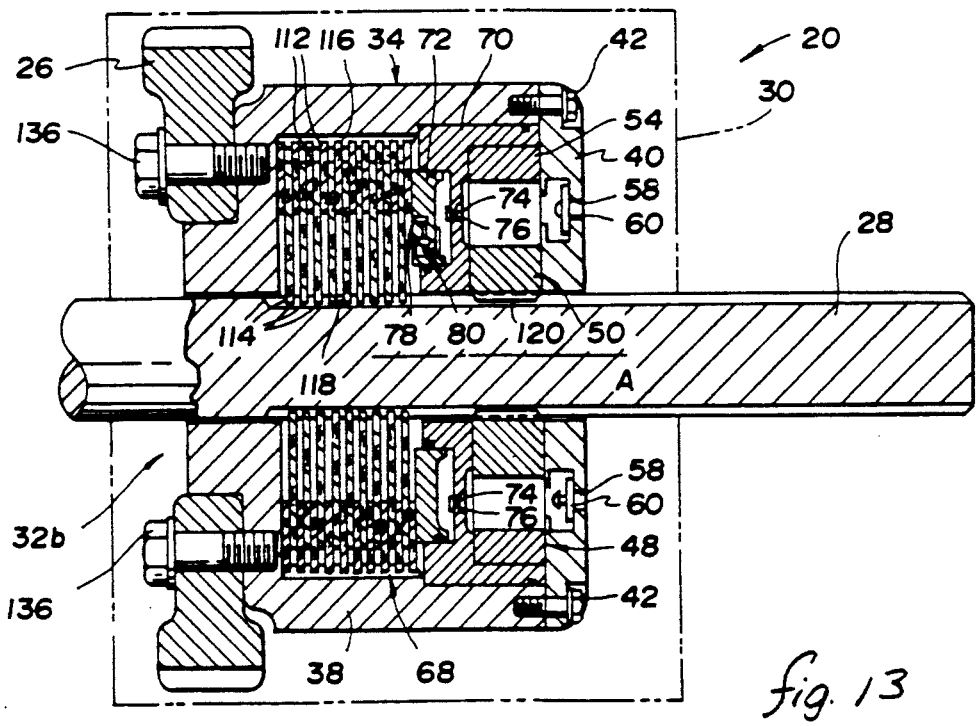
FIG. 13 is a view similar to FIG. of another embodiment of the hydraulic coupling which has a construction having particular utility for use in a vehicle transfer case to connect front and rear axles.

With reference to FIG. 13, another embodiment of the hydraulic coupling is indicated by 32b and includes components that are identical to the previously described embodiment except as will be noted such that like reference numerals are applied thereto and much of the previous description is applicable and need not be repeated. However, the hydraulic coupling 32b functions to provide four wheel driving and has the rotary member 26 provided with a fixed bolt connection 136 to the casing 34. This rotary member 26 has a ring shape through which the rotational axis A extends, and the other rotary member 28 has an elongated shape that extends through the casing 34 and through the ring shape of the one rotary member 26. The hydraulic pump 48 and clutch 68 are located within the casing 34 and operate in the same manner as the previously described in connection with the embodiment of FIG. 1 except for the fact that there is no associated planetary gear set. During use, the one rotary member 26 provides a take off for auxiliary axle driving while the other rotary member 28 provides the driving between the vehicle engine and the primary drive axle. However, when there is a difference in rotational speed between the axles, the operation of the hydraulic coupling 32b then couples the axles to each other in the same manner previously described in connection with the pump and clutch operation.

Figure 14:
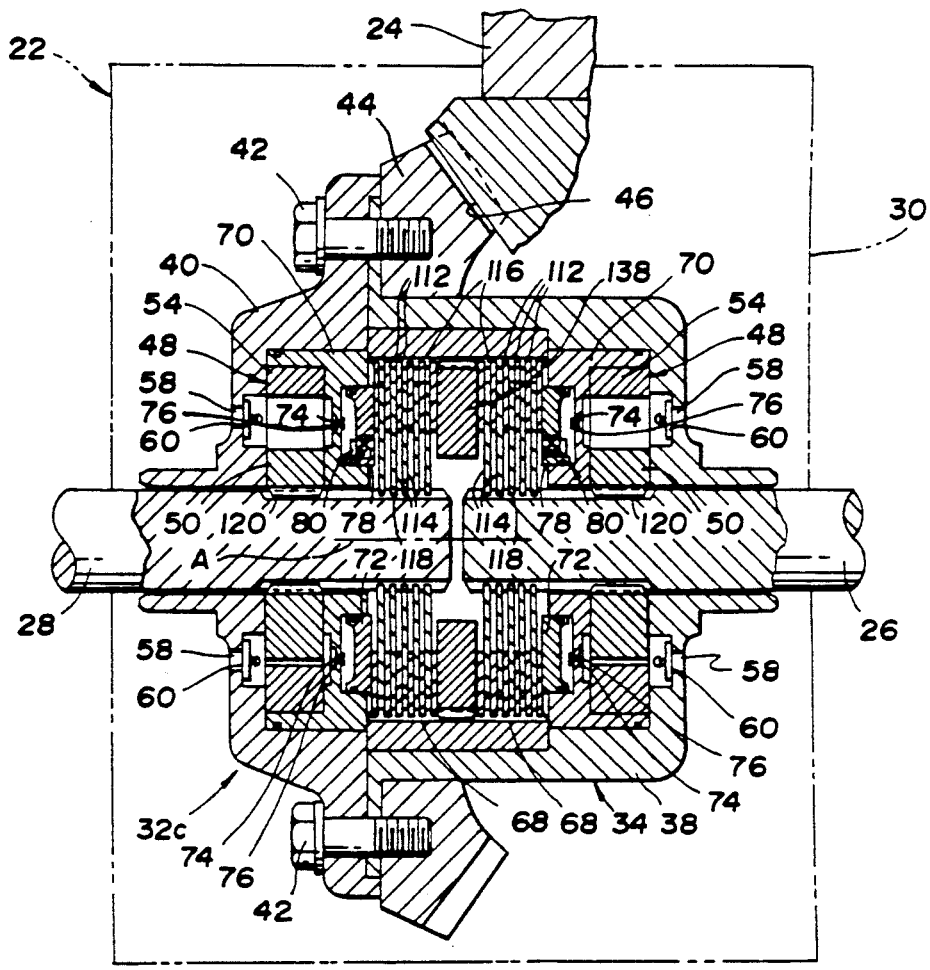
FIG. 14 is a view similar to FIG. 1 of another embodiment which includes a pair of hydraulic pumps and associated clutches that rotatively couple a pair of rotary members of the associated drivetrain.

With reference to FIG. 14, a further embodiment of the hydraulic coupling 32c has a similar construction to the previously described embodiment except as will be noted and thus has like reference numerals applied to like components thereof such that much of the previous description is applicable and need not be repeated. This embodiment of the hydraulic coupling 32c functions as a differential between two axle half shafts 26 and 28 driven by a rotary drive member 24 without any planetary gear set. Rather, each axle half shaft 26 and 28 has an associated hydraulic pump 48 and clutch 68 like the previously described embodiments. The clutches 68 are located adjacent each other and separated as illustrated by a floating spacer 138. As such, actuation of either of the clutches 68 also actuates the other clutch to coordinate their operations with each other.

Figure 15:
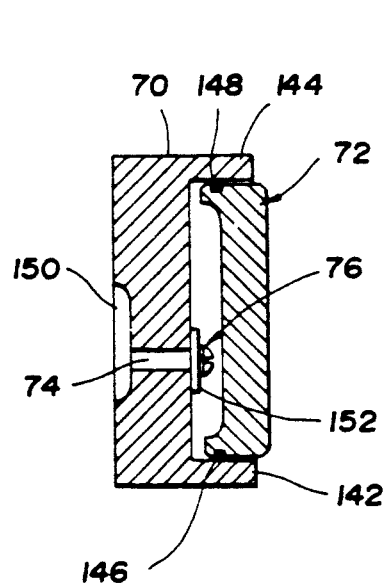
FIG. 15 is an enlarged sectional view illustrating the transfer port and associated check valve through which the hydraulic fluid is pumped to the clutch actuating piston.
Figure 16:
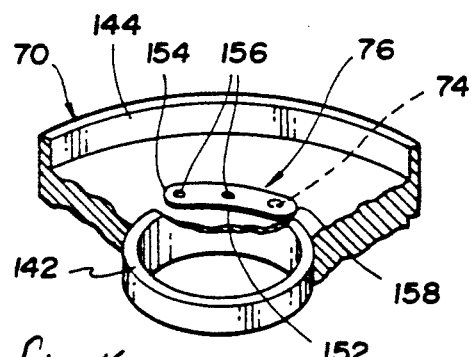
FIG. 16 is a partial perspective view that further illustrates the transfer port check valve in its closed position.
Figure 17:
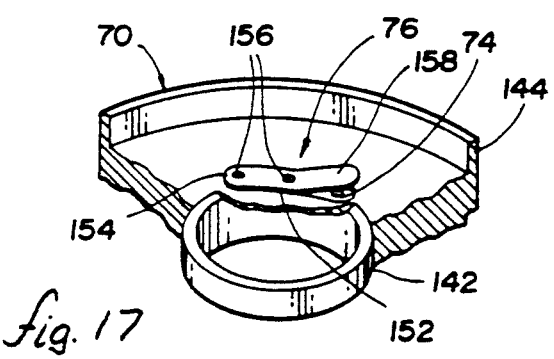
FIG. 17 is a partial perspective view similar to FIG. 16 but with the transfer port check valve shown in its open position.

With reference to FIGS. 15 through 17, each transfer port 74 extends through the insert 70 from the pumped side toward the piston side and has the associated check valve 76 mounted on the piston side where the piston is sealed between inner and outer annular flanges 142 and 144 by respective O-rings 146 and 148. On the pump side, the transfer port 74 has an enlarged shallow collection portion 150 that allows the pumped hydraulic fluid to be received from different radial locations for eventual flow through the transfer port and the check valve 76 in the piston side in order to provide the piston actuation as previously described. As best illustrated in FIGS. 16 and 17, each check valve 76 includes a metallic strip valve element 152 having one end 154 mounted on the metallic insert by suitable fasteners 156 such as the headed bolts shown and has another distal end 158 that is normally biased to the closed position of FIG. 16 by a resilient spring force of the valve element. However, the pressurized fluid upon pumping acts against the spring bias to provide opening of the valve distal end 158 as shown in FIG. 17 to permit the fluid flow that moves the piston and actuates the clutch as previously described.

It should be noted that the flow area through the transfer port 74 shown in FIG. 15 and the flow area through the open control valve 80 shown in FIGS. 9 and 10 are normally designed to be approximately equal to each other. Tuning of the coupling can be performed by making the transfer port flow area smaller than the open control valve flow area to delay the control valve closing and the consequent clutch actuation. Furthermore, faster control valve closing and consequent clutch actuation can be achieved by making the transfer port flow area larger than the flow area of the open control valve. In addition, it may also be possible to tune the operation by controlling the closing spring bias of the transfer port valve element 152.

While the best modes for carrying out the invention have been described in detail, those familiar with the art to which this invention relates will recognize various alternatives, designs and embodiments for practicing the present invention as defined by the following claims.

What is claimed is:

1. A hydraulic coupling for use with a vehicle drivetrain within a housing thereof containing hydraulic fluid to rotatively couple a pair of rotary members about a rotational axis, the hydraulic coupling comprising: a casing of a hollow construction that is rotatable within the housing about the rotational axis and connected to one of the rotary members; a hydraulic pump located within the casing along the rotational axis and including an impeller rotatively connected to the other rotary member and having between five and seven external teeth; the hydraulic pump also including an internal ring gear mounted by the casing for rotation eccentrically with respect to the toothed impeller and including internal teeth of a number one more than the impeller teeth and in a meshing relationship therewith to provide a pumping action upon relative rotation between the casing and the toothed impeller; an inlet port through which hydraulic fluid is pumped into the casing by the hydraulic pump; an outlet port through which the pumped fluid flows; and a control valve including an elongated metallic strip valve element having one end that is mounted in a spaced relationship to the outlet port and having another distal end that is movable between an open position spaced from the outlet port and a closed position that closes the outlet port when the pumped fluid reaches a predetermined pressure to rotatively couple the impeller with the internal ring gear and thereby also couple the pair of rotary members to each other.

2. A hydraulic coupling as in claim 1 further including an elongated mounting recess having one end at which the one end of the elongated valve element is mounted in a spaced relationship to the outlet port and having another end at which the outlet port is located and where the distal end of the elongated valve element is movable between the open and closed positions.

3. A hydraulic coupling as in claim 1 wherein the valve element is of the bimetallic type that moves toward the outlet port upon heating as the hydraulic fluid is heated and that moves away from the outlet port upon cooling as the hydraulic fluid is cooled such that the movement of the valve element to the closed position is compensated for viscosity changes as the hydraulic fluid is heated and cooled.

4. A hydraulic coupling as in claim 3 wherein the outlet port includes a main passage that is closed by the valve element and a bleed passage through which hydraulic fluid bleeds with the valve element closed.

5. A hydraulic coupling as in claim 4 further including an elongated mounting recess having one end at which the one end of the valve element is mounted and having another end at which the main passage and bleed passage of the outlet port are located.

6. A hydraulic coupling as in claim 3 further comprising a valve closure that moves the valve element to the closed position upon rotation of the casing above a predetermined speed.

7. A hydraulic coupling as in claim 6 wherein the valve closure comprises a centrifugal weight having a pivotal connection that provides mounting thereof and also including an actuating portion that moves the valve element to the closed position with respect to the outlet port upon rotation of the casing above the predetermined speed.

8. A hydraulic coupling as in any preceding claim further including a clutch that extends between the casing and the other rotary member, the clutch including an actuating piston, and the casing including a transfer port through which the pumped hydraulic fluid is fed to the clutch actuating piston from the hydraulic pump.

9. A hydraulic coupling as in claim 8 further comprising a planetary gear set that connects the casing and the one rotary member, and the clutch under the operation of the control valve connecting the casing and the other rotary member to thereby limit differential operation of the planetary gear set.

10. A hydraulic coupling as in claim further comprising a planetary gear set that connects the casing and the one rotary member, and the pumping operation of the pump whose impeller is connected to the other rotary member limiting differential operation of the planetary gear set.

11. A hydraulic coupling as in claim 8 wherein the casing has a fixed connection to the one rotary member.

12. A hydraulic coupling as in claim 11 wherein the one rotary member has a ring shape and is secured by the fixed connection to the casing, and the other rotary member having an elongated shape that extends through the casing and through the one ring-shaped rotary member along the rotational axis.

13. A hydraulic coupling as in claim 8 further including a second hydraulic pump having an impeller and internal ring gear with a meshed relationship and a tooth construction like the first mentioned hydraulic pump but with the impeller thereof rotatively connected to the one rotary member, second inlet and outlet ports through which the second hydraulic pump pumps hydraulic fluid into and out of the casing, a second clutch that extends between the casing and the one rotary member, the second clutch including a second actuating piston through which the second outlet port extends, a second control valve including a second elongated metallic strip valve element having one end that is mounted on the second actuating piston in a spaced relationship to the second outlet port and having another distal end that is movable between an open position spaced from the second outlet port and a closed position that closes the second outlet port when the pumped fluid from the second hydraulic pump reaches a predetermined pressure, and the casing including a second transfer port through which the pumped hydraulic fluid is fed to the actuating piston of the second clutch from the second hydraulic pump, whereby the second hydraulic pump and the second clutch cooperate to connect the casing and the one rotary member.

14. A hydraulic coupling for use with a vehicle drivetrain within a housing thereof containing hydraulic fluid to rotatively couple a pair of rotary members about a rotational axis, the hydraulic coupling comprising: a casing of a hollow construction that is rotatable within the housing about the rotational axis and connected to one of the rotary members; a hydraulic pump located within the casing along the rotational axis and including an impeller rotatively connected to the other rotary member and having between five and seven external teeth; the hydraulic pump also including an internal ring gear mounted by the casing for rotation eccentrically with respect to the toothed impeller and including internal teeth of a number one more than the impeller teeth and in a meshing relationship therewith to provide a pumping action upon relative rotation between the casing and the toothed impeller; an inlet port through which hydraulic fluid is pumped into the casing by the hydraulic pump; an outlet port through which the pumped fluid flows; and a control valve including a bimetallic valve element movable between an open position spaced from the outlet port and a closed position that closes the outlet port when the pumped fluid reaches a predetermined pressure to rotatively couple the impeller with the internal ring gear and thereby also couple the pair of rotary members to each other, the valve element moving toward the outlet port upon heating as the hydraulic fluid is heated and moving away from the outlet port upon cooling as the hydraulic fluid is cooled such that the movement of the valve element to the closed position is compensated for viscosity change as the hydraulic fluid is heated and cooled.

15. A hydraulic coupling for use with a vehicle drivetrain within a housing thereof containing hydraulic fluid to rotatively couple a pair of rotary members about a rotational axis, the hydraulic coupling comprising: a casing of a hollow construction that is rotatable within the housing about the rotational axis and connected to one of the rotary members; a hydraulic pump located within the casing along the rotational axis and including an impeller rotatively connected to the other rotary member and having between five and seven external teeth; the hydraulic pump also including an internal ring gear mounted by the casing for rotation eccentrically with respect to the toothed impeller and including internal teeth of a number one more than the impeller teeth and in a meshing relationship therewith to provide a pumping action upon relative rotation between the casing and the toothed impeller; an inlet port through which hydraulic fluid is pumped into the casing by the hydraulic pump; the casing having a transfer port through which the fluid is pumped; a clutch that extends between the casing and the other rotary member; the clutch having an actuating piston that actuates the clutch and that has an outlet port through which the pumped fluid flows; and a control valve including a bimetallic valve element mounted on the actuating piston and movable between an open position spaced from the outlet port and a closed position that closes the outlet port when the pumped fluid reaches a predetermined pressure to rotatively couple the impeller with the internal ring gear and thereby also couple the pair of rotary members to each other, the valve element moving toward the outlet port upon heating as the hydraulic fluid is heated and moving away from the outlet port upon cooling as the hydraulic fluid is cooled such that the movement of the valve element to the closed position is compensated for viscosity change as the hydraulic fluid is heated and cooled.

16. A hydraulic coupling for use with a vehicle drivetrain within a housing thereof containing hydraulic fluid to rotatively couple a pair of rotary members about a rotational axis, the hydraulic coupling comprising: a casing of a hollow construction that is rotatable within the housing about the rotational axis and connected to one of the rotary members; a hydraulic pump located within the casing along the rotational axis and including an impeller rotatively connected to the other rotary member and having between five and seven external teeth; the hydraulic pump also including an internal ring gear mounted by the casing for rotation eccentrically with respect to the toothed impeller and including internal teeth of a number one more than the impeller teeth and in a meshing relationship therewith to provide a pumping action upon relative rotation between the casing and the toothed impeller; an inlet port through which hydraulic fluid is pumped into the casing by the hydraulic pump; the casing having a transfer port through which the fluid is pumped; a clutch that extends between the casing and the other rotary member; the clutch having an actuating piston that actuates the clutch and that has an outlet port through which the pumped fluid flows; the outlet port including a main passage and a bleed passage; the actuating piston having an elongated recess having one end spaced from the outlet port and having another end at which the outlet port is located; and a control valve including an elongated bimetallic valve element having one end mounted within the piston recess at the one end thereof and having another end that is movable between an open position spaced from the outlet port and a closed position that closes the main passage of the outlet port when the pumped fluid reaches a predetermined pressure to rotatively couple the pair of rotary members to each other, the bleed passage of the outlet port allowing a bleed fluid flow through the piston with the valve element closed, the valve element moving toward the outlet port upon heating as the hydraulic fluid is heated and moving away from the outlet port upon cooling as the hydraulic fluid is cooled such that the movement of the valve element to the closed position is compensated for viscosity changes as the hydraulic fluid is heated and cooled.

17. A hydraulic coupling as in claims 1 or 2 further comprising a valve closure that moves the valve element to the closed position upon rotation of the casing above a predetermined speed.

18. A hydraulic coupling as in claim 17 wherein the valve closure comprises a centrifugal weight having a pivotal connection that provides mounting thereof and also including an actuating piston that moves the valve element to the closed position with respect to the outlet port upon rotation of the casing above the predetermined speed.

19. A hydraulic coupling as in claim 18 further including a clutch that extends between the casing and the other rotary member, the clutch including an actuating piston, and the casing including a transfer port through which the pumped hydraulic fluid is fed to the clutch actuating piston from the hydraulic pump.

20. A hydraulic coupling as in claim 1 further including a clutch that extends between the casing and the other rotary member, the clutch including an actuating piston, the outlet being through the actuating piston, the control valve being mounted on the actuating piston, the casing including a transfer port through which the pumped hydraulic fluid is fed to the clutch actuating piston from the hydraulic pump, and a valve closure that is mounted on the actuating piston and operable to move the valve element to the closed position upon rotation of the casing above a predetermined speed.

21. A hydraulic coupling as in claim 20 wherein the valve closure comprises a centrifugal weight having a pivotal connection that provides mounting thereof on the actuating piston and also including an actuating portion that moves the valve element to the closed position with respect to the outlet port upon rotation of the casing above the predetermined speed.

22. A hydraulic coupling as in claim 21 wherein the actuating piston includes an elongated mounting recess having one end at which the one end of the valve element is mounted and having another end at which the outlet port is located.

* * * * *

UNITED STATES PATENT AND TRADEMARK OFFICE
CERTIFICATE OF CORRECTION

PATENT NO. : 5,310,388
DATED : May 10, 1994
INVENTOR(S) : Murat N. Okcuoglu et al.

It is certified that error appears in the above-indentified patent and that said Letters Patent is hereby corrected as shown below:

Column 8, line 8, after "to FIG." insert --1,--.

Column 11, line 45, claim 10, after "claim" insert --1--.

Column 13, line 16, claim 15, after "viscosity" delete "change" and insert --changes--.

Column 14, line 1, claim 16, after "couple the" insert --impeller with the internal ring gear and thereby also couple the--.

Signed and Sealed this

Twenty-fifth Day of October, 1994

BRUCE LEHMAN

*Attest:*

*Attesting Officer*  *Commissioner of Patents and Trademarks*